March 5, 1929.    P. W. HORN ET AL    1,704,322
RECEPTACLE OPERATED VALVE
Filed Aug. 5, 1927
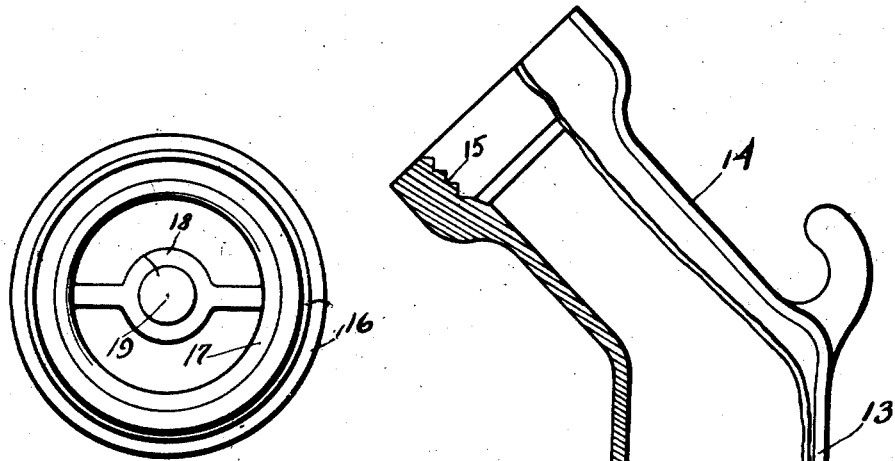
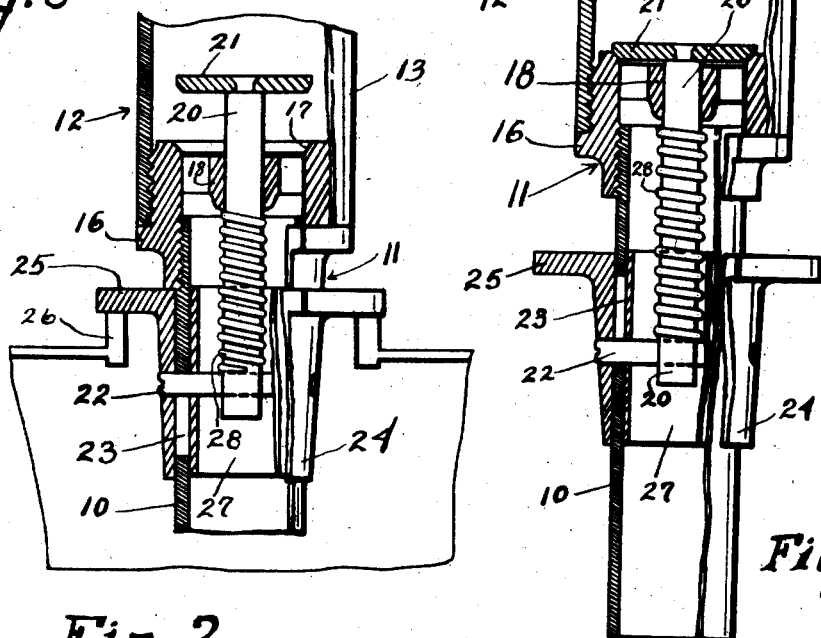
P. W. Horn
and
N. M. Patrick
Inventors Patented Mar. 5, 1929.

1,704,322

UNITED STATES PATENT OFFICE.

PLEASANT W. HORN AND NOBLE M. PATRICK, OF CHARLOTTE, NORTH CAROLINA.

RECEPTACLE-OPERATED VALVE.

Application filed August 5, 1927. Serial No. 210,861.

Our invention relates to a dispensing mechanism, and more especially to a closure operated valve for dispensing gasoline at filling stations.

An object of our invention is to provide a closure operated valve so constructed as to prevent leakage, also being adapted to allow a maximum flow of fluid with a minimum diameter of the portion of the device which enters the container.

Some of the objects of our invention having been stated, other objects will appear as the description proceeds when taken in connection with the accompanying drawing, in which—

Figure 1 is an elevation of our device with parts broken away for a better illustration, and showing the valve in closed position;

Figure 2 is an elevation of valve mechanism partly in cross section and showing the valve in open position and inserted into a container;

Figure 3 is a plan view of the reducing bushing and valve seat.

Referring more particularly to the drawings, numeral 10 indicates a straight tubular member and threadably secured to the upper end of the member 10 is the reducing bushing 11, this member 11 being interiorly threaded in its lower portion for the reception of the member 10. The upper portion of the member 11 is exteriorly threaded for the reception of the member 12. This member 12 has the straight portion 13 and the curved portion 14, the upper end of the portion 14 being enlarged and being interiorly threaded as at 15 for the reception of a hose or other fluid conducting member (not shown). The member 11 has the shoulder portion 16, against which the member 12 is adapted to snugly fit, and in its upper portion has the valve seat 17 and the spider member 18, said spider member having the hole 19 therein for the reception of the valve stem 20, said valve stem having the valve 21 secured on its upper end. The lower end of the valve stem 20 has a hole therethrough in which the pin 22 is mounted. The tubular member 10 has the oppositely disposed vertical slots 23 in which the pin 22 is adapted to slide. Slidably secured on the exterior of the member 10 is the cuff-member 24 which has an enlarged portion 25 at its upper end, said portion 25 being adapted to engage the opening in a container 26. Fitting inside of the member 10 is the tubular sleeve member 27 which is pierced by the pin 22, and is adapted to slide in the member 10 with the valve stem 20. Secured around the valve stem 20 is the compression spring 28 which fits against the spider member 18 and the pin 22. This spring has a tendency to keep the valve 21 in its seat 17.

It is thus seen that due to the peculiar shape of the member 11, we obtain a maximum flow of fluid through the valve portion together with a minimum delivery portion 10. We have found by experiment that when the sleeve 27 is not used, that such fluids as gasoline will pass through the slots 23 and will bubble out between the cuff-member 24 and the member 10, but by using the sleeve member 27 we find that such leakage is entirely eliminated.

It is, of course, obvious that the method of operation of this device is that, when the device is inserted into a container that the weight of the device, the hose connected thereto, and the column of fluid contained in the hose and upper portion of the device will cause the valve 21 to open, as is shown in Figure 2.

In the drawings and specification, we have set forth a preferred embodiment of our invention, and although specific terms are employed, they are used in a generic and descriptive sense only, and not for purposes of limitation, the scope of the invention being set forth in the appended claims.

We claim:

1. In a device of the class described, a valve housing, a valve seat member screwed into said housing, a valve stem bearing in said member, a tubular member screwed into the lower portion of the valve seat member, the valve stem being extended downwardly into the tubular member, a tubular cuff member slidably mounted on the first-named tubular member, slots in the first named tubular member, a hole in the lower portion of the valve stem, a pin secured thru the lower portion of the valve stem and passing through the slots in the first named tubular member and also through the second tubular cuff member, a coiled spring mounted around the valve stem between the valve stem bearing and the pin, and a tubular sleeve slidably mounted on the interior of the first named tubular member, holes in the tubular sleeve thru which the pin is adapted to pass, said sleeve being adapted to slide with the valve stem.

2. In a receptacle operated valve, a valve housing, a reducing bushing threadably secured in the lower end of the valve housing, a valve seat in the upper end of the reducing bushing, a valve stem connected to the valve and extending downwardly therefrom, a guide for the valve stem in the reducing bushing, interior threads in the lower portion of the reducing bushing, an extended tubular portion threadably secured in the lower end of the reducing bushing, vertically disposed slots in the extended tubular portion, a second tubular member slidably mounted on the exterior of the extended tubular portion, a tubular sleeve member slidably mounted on the inside of the extended tubular portion, a pin passing thru the second and third tubular members, and through the vertically disposed slots, and also passing through the lower end of the valve stem, and a coiled spring mounted around the valve stem between the pin and the guide for the valve stem adapted to hold the valve in closed position.

3. In a dispensing valve, a valve housing, a reducing bushing mounted in the lower portion of the valve housing, a tubular delivery member secured to the lower end of the reducing bushing, a valve and valve stem mounted in the said bushing, outer and inner tubular members slidably mounted with relation to the tubular delivery portion, said outer and inner members being connected to each other and to the lower end of the valve stem, and resilient means adapted to normally close the valve.

4. In a dispensing valve having a valve and valve stem, a valve housing, a reducing bushing threadably connected to the valve housing and having a valve seat therein; a delivery member connected to the reducing bushing, outer and inner members slidably mounted with relation to the delivery member, said outer and inner members being connected to the valve stem to slide therewith, a plurality of slots in the delivery member in which the means connecting the inner and outer members is adapted to slide.

In testimony whereof we affix our signatures.

PLEASANT W. HORN.
NOBLE M. PATRICK.